United States Patent [19]
Miyawaki

[11] Patent Number: 5,995,771
[45] Date of Patent: Nov. 30, 1999

[54] IMAGE FORMING APPARATUS ADMINISTRATION SYSTEM

[75] Inventor: Shohzoh Miyawaki, Saitama-ken, Japan

[73] Assignee: Ricoh Company, Ltd., Tokyo, Japan

[21] Appl. No.: 09/037,915

[22] Filed: Mar. 9, 1998

[30] Foreign Application Priority Data

Mar. 7, 1997 [JP] Japan ................................. 9-052935

[51] Int. Cl.$^6$ .......................... G03C 15/00; G03C 21/00
[52] U.S. Cl. ..................... 399/8; 399/9; 399/11; 399/75; 399/77
[58] Field of Search .................. 399/75, 77, 8, 399/9, 10, 11; 395/114; 358/406, 437, 441, 442

[56] References Cited

U.S. PATENT DOCUMENTS 5,720,014  2/1998  Ikeda et al. .............................. 395/114
5,784,663  7/1998  Hayashi et al. ............................ 399/8

FOREIGN PATENT DOCUMENTS

3-293371  12/1991  Japan .
6-178003   6/1994  Japan .
6-178026   6/1994  Japan .
6-189060   7/1994  Japan .
6-217028   8/1994  Japan .
7-200797   8/1995  Japan .

Primary Examiner—Richard Moses
Assistant Examiner—Shival Virmani
Attorney, Agent, or Firm—Oblon, Spivak, McClelland, Maier & Neustadt, P.C.

[57] ABSTRACT

An image forming apparatus administration system includes an image forming apparatus for forming an image on a sheet of paper. A service terminal is connected to the image forming apparatus through a communication line and administers conditions of the image forming apparatus. An operation panel has operation keys and a screen. A changing device can be operated to change an indication of the operation panel from an indication for inputting an operation command for image formation to an indication for inputting a request command for transmitting data from the image forming apparatus to the service terminal. A transmitting device can transmit the data in response to the request command and the changing device changes the indication of the operation panel from the indication for inputting a request command for transmitting data from the image forming apparatus to the service terminal to the indication for inputting an operation command for image formation before the transmission of the data is completed.

27 Claims, 12 Drawing Sheets

IMAGE FORMING APPARATUS ADMINISTRATION SYSTEM

BACKGROUND OF THE INVENTION

1. Field of the Invention

The present invention relates to an image forming apparatus administration system in which at least one image forming apparatus, such as a copier, a printer, a facsimile machine, or similar image forming apparatus, and a service terminal are connected through a communication line. The present invention is further related to the control of a display of the image forming apparatus during a communication process with the service terminal.

2. Discussion of Background

As an example of an image forming apparatus administration system, a system is known in which an image forming apparatus such as a copier can be connected to a service terminal, which for example may be installed in a service center, utilizing a communication line, such as a public line or the like.

With this type of image forming apparatus administration system, an operator of the image forming apparatus can transmit a request, such as a repair request and a request of a need for consumption articles such as sheets of paper and toner, to the service terminal by inputting a transmission command from keys on an operation panel of the image forming apparatus. If the image forming apparatus cannot be connected to the service terminal, a subsequent attempt to establish communication may be made.

In this type of system, the operator of the image forming apparatus can go to the keyboard of the image forming apparatus and enter a communication mode to connect to the service terminal via the communication line. In this system after the operator inputs a request at the image forming apparatus, for example at a keypad or a display at the image forming apparatus, the request is then sent to the service terminal through the communication line. In this instance the operator must then wait for a response to this request from the service terminal before the image forming apparatus can be utilized for an image forming operation.

That is, in this system after the request is issued from the image forming apparatus to the service terminal through the communication line, the image forming apparatus cannot execute image forming operations until a response to this request is issued from the service terminal and is then communicated from the service terminal through the communication line to and received at the image forming apparatus. This results in an inefficient use and unnecessary downtime in the operation of the image forming apparatus.

SUMMARY OF THE INVENTION

Accordingly, it is an object of the present invention to provide a novel image forming apparatus administration system in which downtime of the image forming apparatus is as short as possible.

It is another object of the present invention to implement a novel control of communication between an image forming apparatus and a service terminal and also to control a display device of the image forming apparatus.

These and other objects of the present invention are achieved by a novel image forming apparatus and method of operating an image forming apparatus in which when a service request is made to a service terminal from the image forming apparatus, the image forming apparatus can still execute image forming operations while awaiting a response to the service request from the service terminal.

Further, in the present invention a display of an image forming apparatus can generate display images for both an image forming mode and a communication mode. In the present invention, this display can be changed from a display for the image forming mode to a display for the communication mode if an operator wishes to transmit a service request to a service terminal. Further, the display can be changed back to the image forming mode display before the communication between the image forming apparatus and the service terminal is completed, i.e. before the response to the service request from the image forming apparatus is received at the image forming apparatus from the service terminal.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
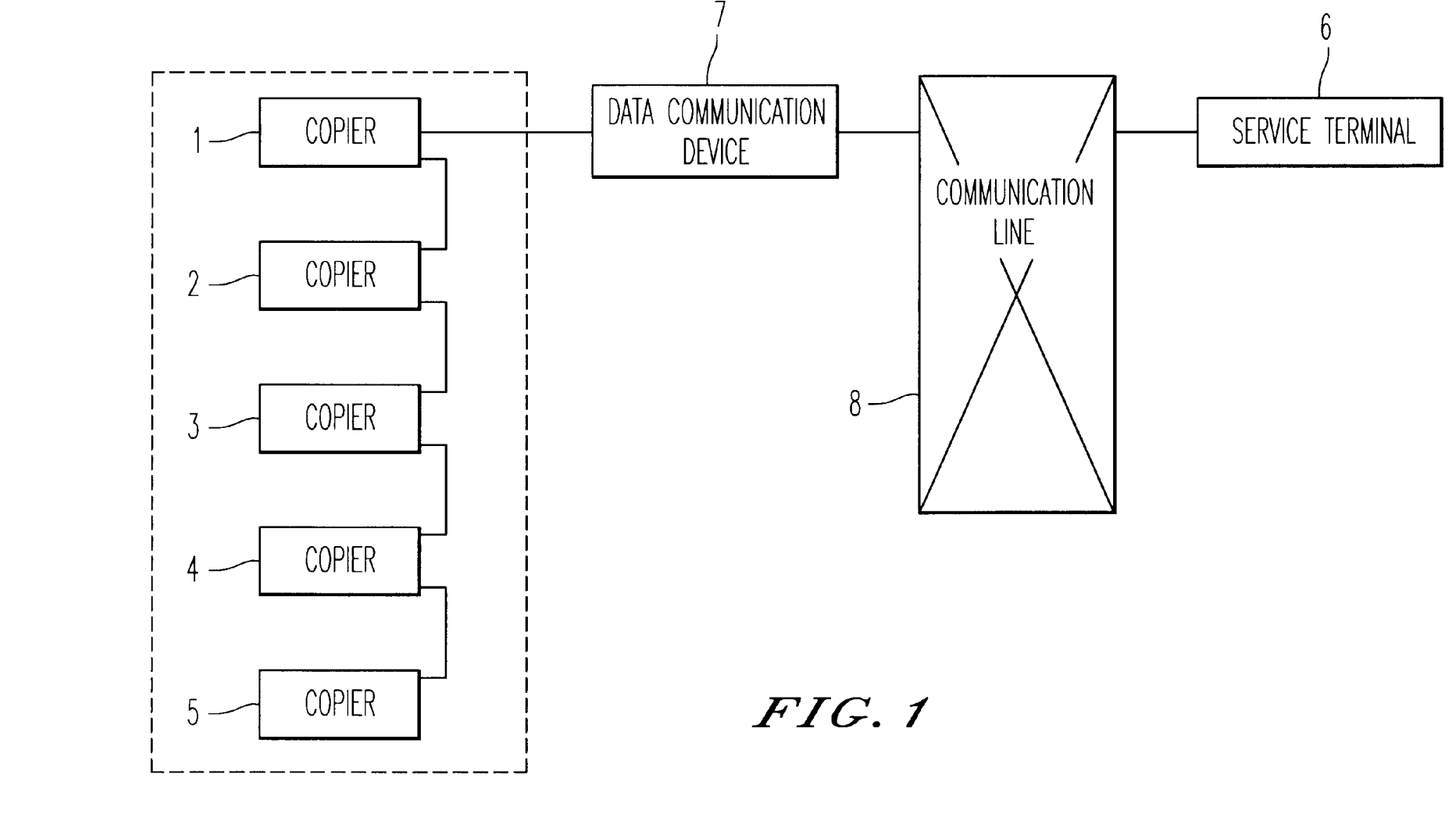
FIG. 1 is a schematic block diagram of an image forming apparatus administration system embodying the present invention.

Referring now to the drawings, wherein like reference numerals designate identical or corresponding parts throughout the several views, and more particularly to FIG. 1 thereof, an image forming administration system is shown which includes five copiers 1 to 5, as examples of image forming apparatus, connected to a service terminal 6 through a data communication device 7 and a communication line 8. The data communication device 7 and service terminal 6 administer the copiers 1 to 5.

The system shown in FIG. 1 can be structured such that the service terminal 6 is a central control device located at a central station which is remotely positioned from the copiers 1 to 5. This service terminal 6 can also be located within a local region shared with the copiers 1 to 5. Further, the copiers 1 to 5, data communication device 7, communication line 8 and service terminal 6 can all be connected by a local area network (LAM). The physical positions and the exact nature of the form of the communication between the devices in FIG. 1 can clearly vary as understood by those of ordinary skill in the art.

The data communication device 7 operates as one administration control for copiers 1 to 5 and transmits a command such as a reading command for reading status data of the copiers 1 to 5 or a writing command for writing control parameters in memories in the copiers 1 to 5. Further, the data communication device 7 transmits an indication that service or other requirements are needed for copiers 1 to 5, such as a repair request or a request of a need for consumption articles such as sheets of paper and toner, to the service terminal 6 through the communication line 8. The data communication device 7 also transmits an alarm message for preventive maintenance for any of copiers 1 to 5 to the service terminal 6 when, for example, for any of copiers 1 to 5 a predetermined number of copiers have been made, a predetermined period of time has elapsed, an output from sensors which sense conditions of processing devices in a copier has reached a predetermined value, etc. If desired, when a predetermined number of copies have been made for any of copiers 1 to 5, a flag in a memory in data communication device 7 is set. Subsequently, when a predetermined set time such as 7:00 p.m. or 1:00 a.m. is reached, a preventative maintenance signal is transmitted from the data communication device 7 to the service terminal 6, when the flag is set.

Electric power can be supplied to the data communication device 7 for 24 hours a day so that data communication device 7 can operate and transmit information even if electric power to the copiers 1 to 5 is cut off. The data communication device 7 and the copiers 1 to 5 to can be connected in a multi-drop form through a serial communication interface RS-485, although any other communication may be used. The data communication can be established by means of a polling operation and a selecting operation by the data communication device 7 of the copiers 1 to 5.

Figure 2:
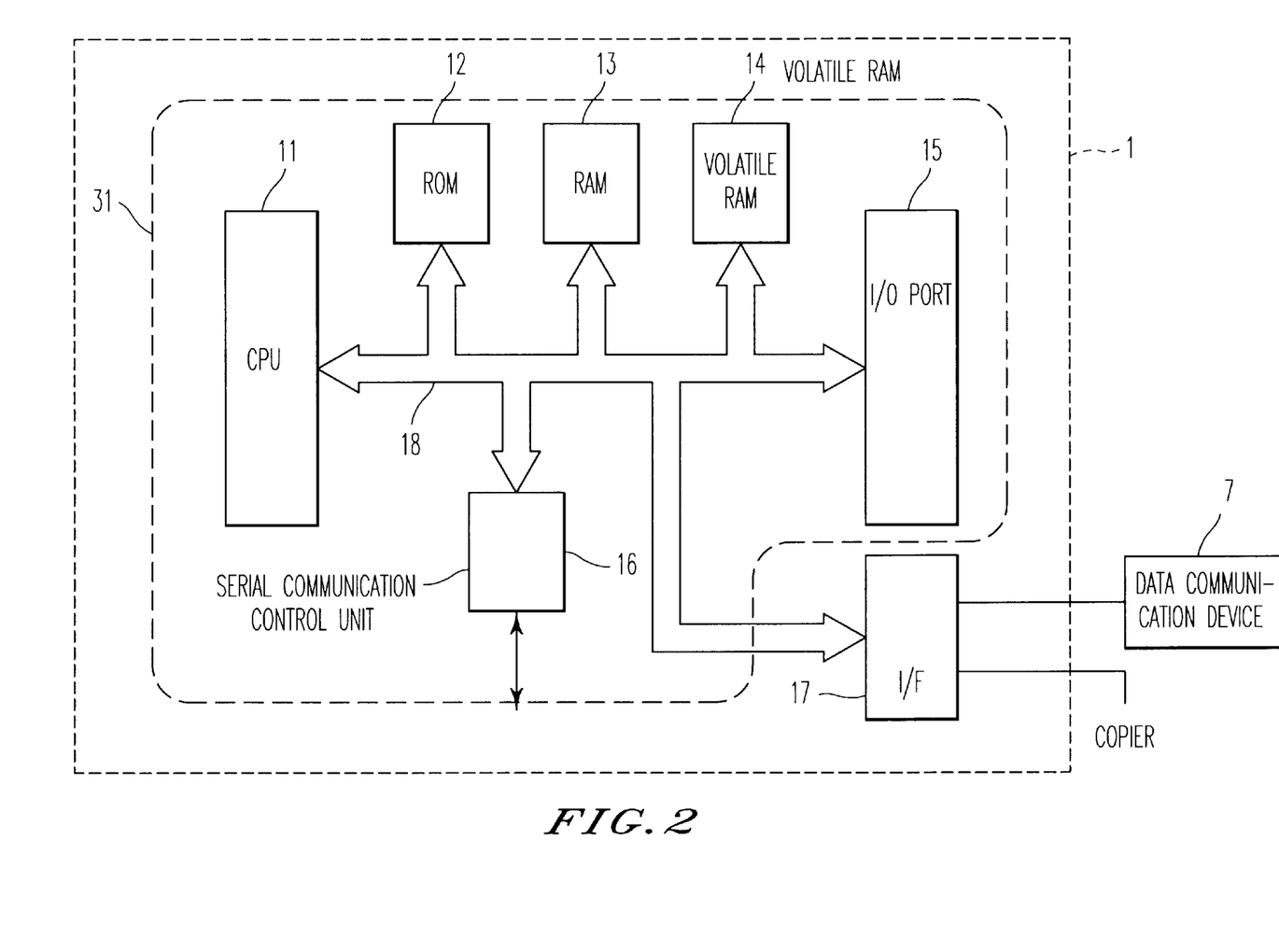
FIG. 2 is a schematic block diagram of an image forming apparatus embodying the present invention.

FIG. 2 shows a control unit of the copier 1. Explanations of the control units of the copiers 2 to 5 are omitted since the configurations of the control units of the copiers 2 to 5 are the same as that of the copier 1 of FIG. 2. The control unit of the copier 1 includes a copier controller 31 which includes a central processing unit (CPU) 11, a read only memory (ROM) 12, a random access memory (RAM) 13, a non-volatile RAM 14, an input/output port (I/O port) 15, a serial communication control unit 16, an interface (I/F) 17, and a system bus 18.

The CPU 11, which may be implemented in any desired manner including utilizing a microprocessor, controls the overall activities of the copier controller 31 according to a control program in the ROM 12. The ROM 12 stores the control program and the like for controlling the operation of the CPU 11. The RAM 13 is operable as a work-memory for the CPU 11. The non-volatile RAM 14 stores contents of mode instructions input from an operation panel of copier 1. The non-volatile RAM 14 can be backed-up by a battery. Output devices in the copier 1 such as motors, solenoids, clutches and the like, sensors, switches, and the like, are connected to the I/O port 15. Plural serial communication control units 16 are provided in the copier controller 31 and communicate information with an operation panel, a document feeder, a finisher, and the like.

The interface 17 controls communication between the copier controller 31 and the data communication device 7, and may be implemented in any suitable manner. As a result of utilizing a designated interface 17, a load for communication on the CPU 11 is reduced. The interface 17 can be positioned either internally of or externally to the copier 1 to 5. If the CPU 11 has enough capacity for controlling the communication, it is also possible to design the system such that the CPU 11 controls the communication instead of the interface 17. In the present embodiment, the interface 17 has the following functions.

1) watching a polling operation and a selecting operation from the data communication device 7 to the copier 1;

2) processing responses which indicate that data transmission is a success (success-response) or that data transmission is a failure (failure-response);

3) checking correctness of data between the interface 17 and the data communication device 7 and parity, and requesting retransmission in a case of a transmission error; and 4) header processing of data between the interface 17 and the data communication device 7.

In FIG. 2, the system bus 18 includes an address bus, a control bus and a data bus. The CPU 11, the ROM 12, the RAM 13, the non-volatile RAM 14, the I/O port 15, the serial communication control unit 16 and the interface 17 are connected to each other through the system bus 18.

Figure 3:
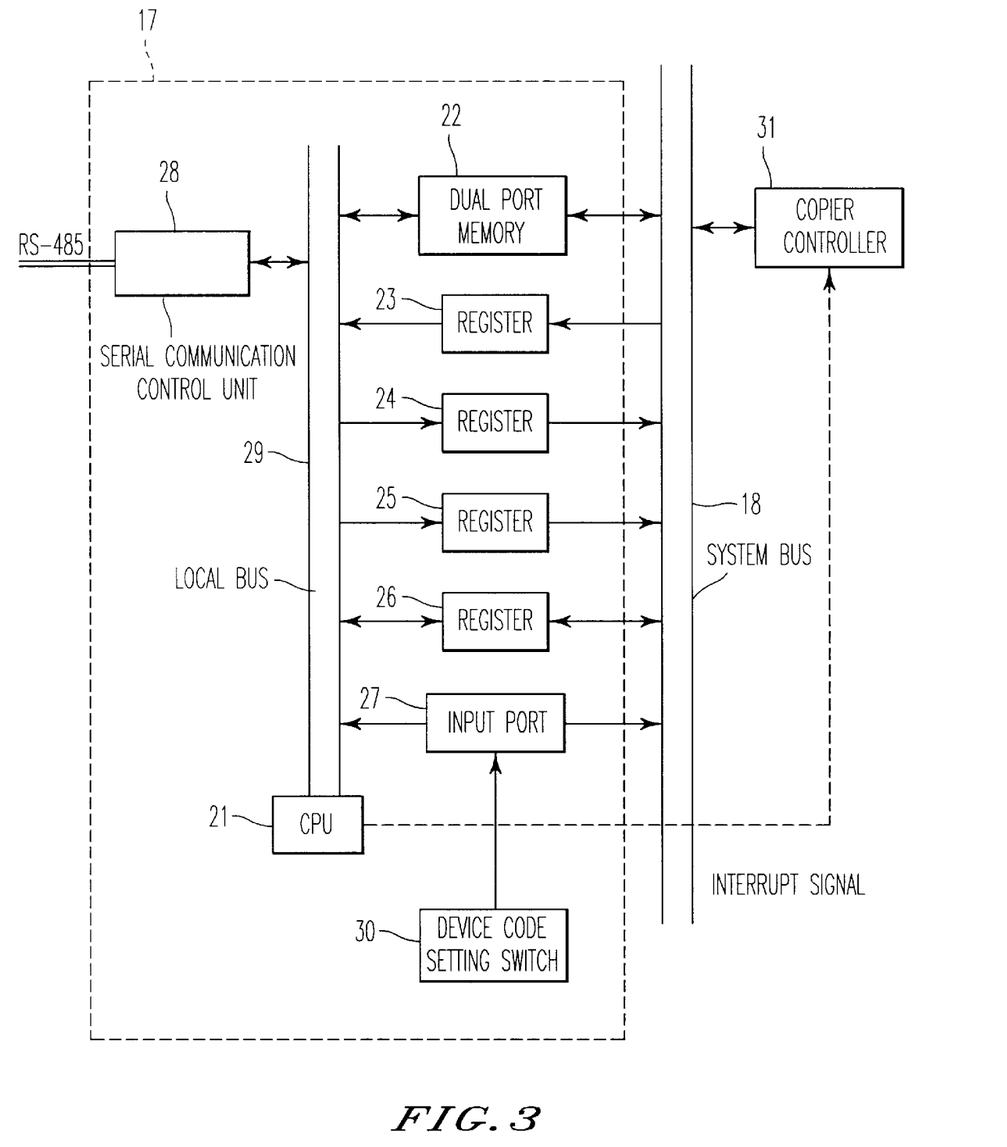
FIG. 3 is a schematic block diagram of an interface embodying the present invention.

FIG. 3 is a block diagram showing the interface 17 of FIG. 2. Referring to FIG. 3, the interface 17 includes a CPU 21, a dual port memory 22, registers 23 to 26, an input port 27, a serial communication control unit 28, a local bus 29, and a device code setting switch 30.

The CPU 21 controls the overall activities of the interface 17 and can act as a communication CPU to free the CPU 11 of the copier 1 for image forming operations. The dual port memory 22 can be read from and written to by both of the CPU 11 of FIG. 2 and the CPU 21. Text data is communicated between the interface 17 and the copier controller 31 through the dual port memory 22. The text data is temporally stored in the registers 23 to 26 when the data is communicated between the interface 17 and the copier controller 31.

The device code setting switch 30 sets a unique device code corresponding to each copier. The device code is used to discriminate a target copier during a polling operation and a selecting operation. The serial communication control unit 28 can be connected to the data communication device 7 and the interfaces in the other copiers 2 to 5.

Figure 4:
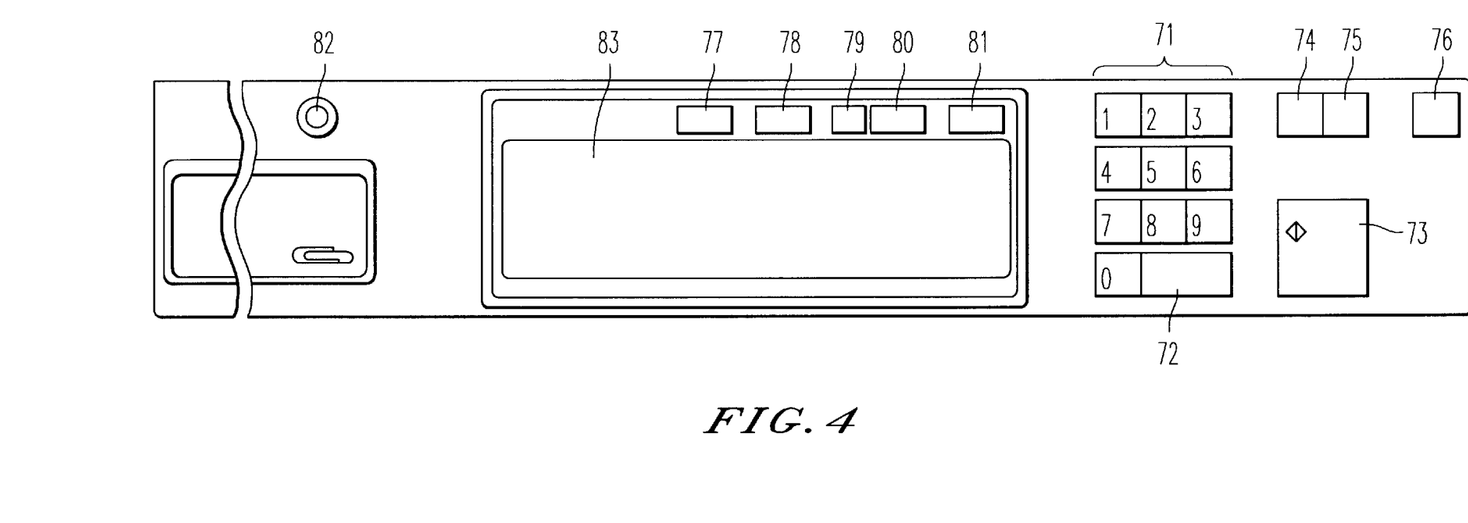
FIG. 4 shows an operation panel in the image forming apparatus embodying the present invention.

FIG. 4 shows an operation panel of the copiers 1 to 5. Referring to FIG. 4, the operation panel includes a ten-key pad 71 for inputting numbers, a clear/stop key 72 for clearing the input numbers and stopping a copying operation, a start key 73 for starting the copying operation, an enter key 74 for setting an input copying mode, an interrupt key 75 for interrupting the copying operation and for permitting the setting of another copying mode, a mode clear/preheating key 76 for clearing set copying mode and for setting a preheating mode, a mode check key 77 for indicating the copying mode which is set, and a screen changing key 78 for changing contents of indication in response to an experience level of the operator of the copier. Further, the operation panel includes a reading out key 79 for reading out the copying mode set by an operator and stored in memory, a register key 80 for registering the copying mode to memory, a guidance key 81 for indicating a guidance message on the screen 83, and a contrast adjusting nob 82 for adjusting the contrast of the screen 83. The screen 83 includes dot display elements and may be implemented by a liquid crystal display or a fluorescent screen and a matrix touch panel of a transparent sheet in which touch sensors are provided. Alternatively, any other desired type of display may be used.

Figure 5:
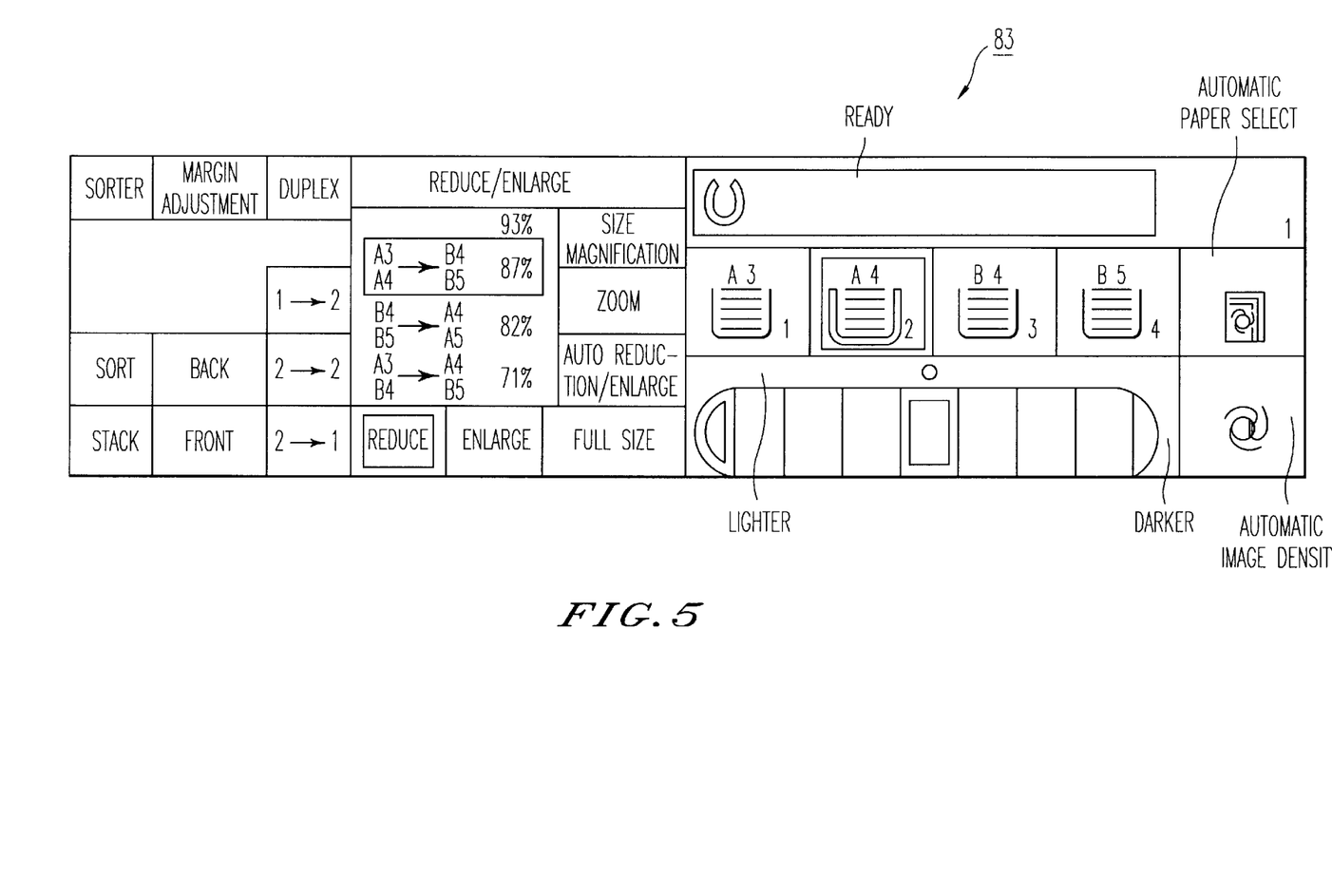
FIG. 5 shows a screen of the operation panel of FIG. 4 with various messages on a display according to the present invention.

FIG. 5 shows the screen 83 of the operation panel of FIG. 4 in a typical usage. The screen 83 of FIG. 5 includes a display for inputting an operation command for image formation when a power switch is turned on. A plurality of image forming operation modes, such as a size of paper, image density, magnification and reduction ratio, a duplex mode, a binding margin setting mode, a sorting mode, and the like, are set by pressing keys. The color of pressed keys may be reversed as compared to keys which are not pressed.

Figure 6:
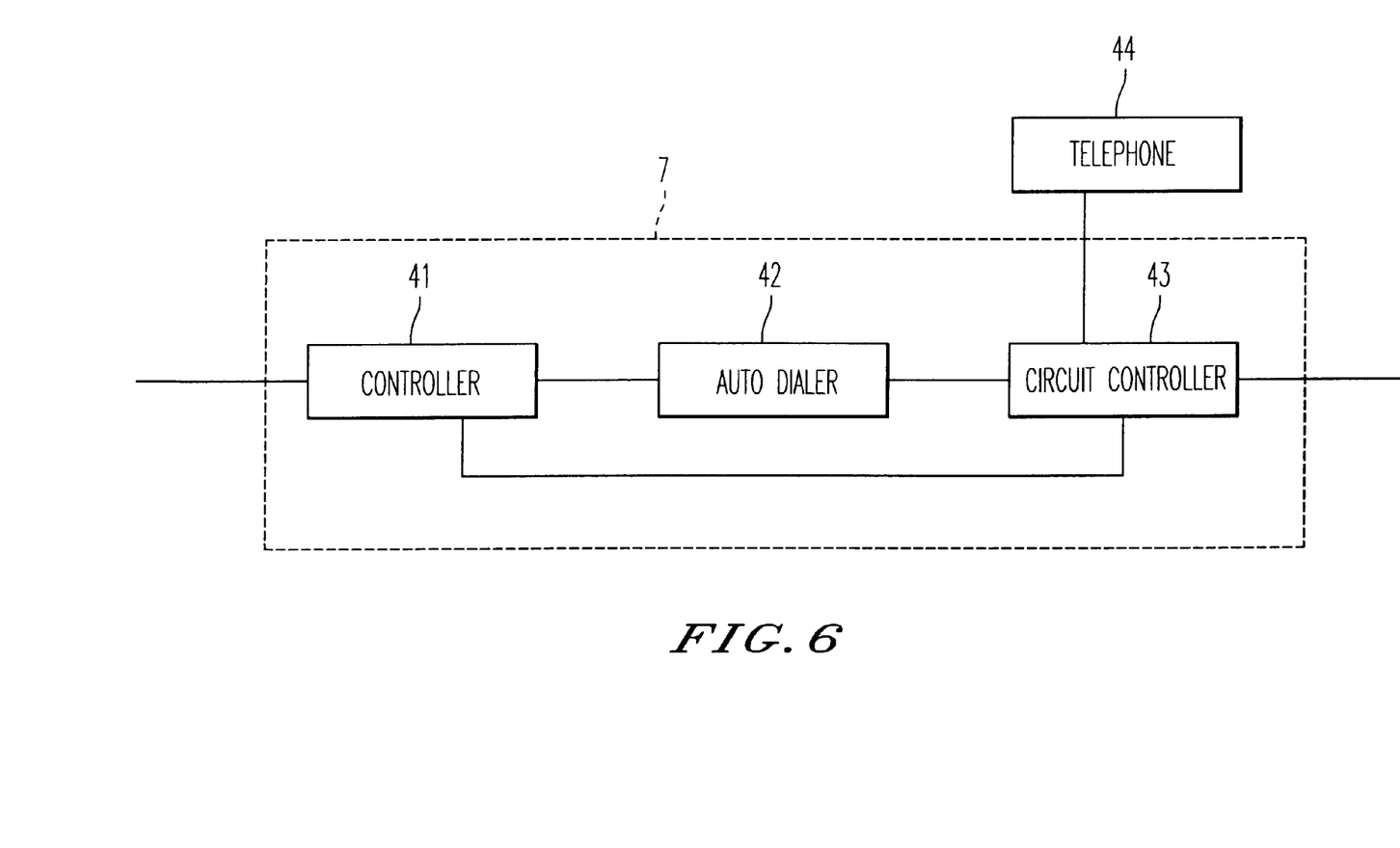
FIG. 6 is a schematic block diagram of a data communication device embodying the present invention.

FIG. 6 is a block diagram showing the data communication device 7 of FIG. 1. The data communication device 7 includes a controller 41, an auto dialing unit 42, and a circuit control unit 43. The controller 41 controls communication between the copiers 1 to 5 and the data communication device 7, and the communication between the data communication device 7 and the service terminal 6 through the communication line 8. If the service terminal 6 is remotely located from the copiers 1 to 5 and data communication device 7, the auto dialing unit 42 can call the service terminal 6 in response to reports from the copiers 1 to 5. The circuit control unit 43 switches the circuit between the data communication device 7 and a telephone 44. If the service terminal 6 is not remotely located, the auto dialing unit 42 and telephone need not be provided or operated.

The controller 41 can include a ROM, a CPU, a RAM, a non-volatile RAM, a serial communication unit, an I/O port, a timer for counting real time, etc. Such a non-volatile RAM can store data communicated between the service terminal 6 and each copier 1 to 5, device codes for identifying one copier among the copiers 1 to 5, a telephone number of the service terminal 6, a number of times of recalling the service terminal 6, an interval of recalling and date and time for transmitting total counter value of copiers, etc.

The image forming apparatus administration system has at least the following functions:

1) Communication control from the service terminal 6 or the data communication device 7 to the copiers 1 to 5;
2) Communication control from the copiers 1 to 5 to the service terminal 6 or the data communication device 7; and
3) Control the data communication device 7 itself.

Each function is now explained in detail.

1) Communication Control From The Service Terminal 6 Or The Data Communication Device 7 To The Copiers 1 to 5.

a) A number of copies of a selected copier, a number of copies of each paper feeder of a selected copier, a number of copies of each paper size, a number of paper jams of a selected copier, a number of paper jams of each paper size, a number of jams of each of paper transport positions, etc. are read from the copiers 1 to 5 by the service terminal 6 through the data control device 7.

b) The above mentioned each number is initialized.

c) Control values for controlling operations of processing devices for image formation in the copier such as voltages, electric current, resistors and control timing are written in respective memories in each copier. Further, the control values stored in the memories are read in response to a command from the service terminal 6.

d) Each copier transmits a success-response or a failure-response to the service terminal 6 through the data communication device 7, or the copier transmits the success-response or the failure-response to the data communication device 7 in response to received data.

One of copiers 1 to 5 is selected by a selecting operation and transmits data or information to the data communication device 7 according to a) to d) above. The selecting operation is the operation by which the data communication device 7 selects one copier among the copiers 1 to 5 connected to the data communication device 7.

Figure 7:
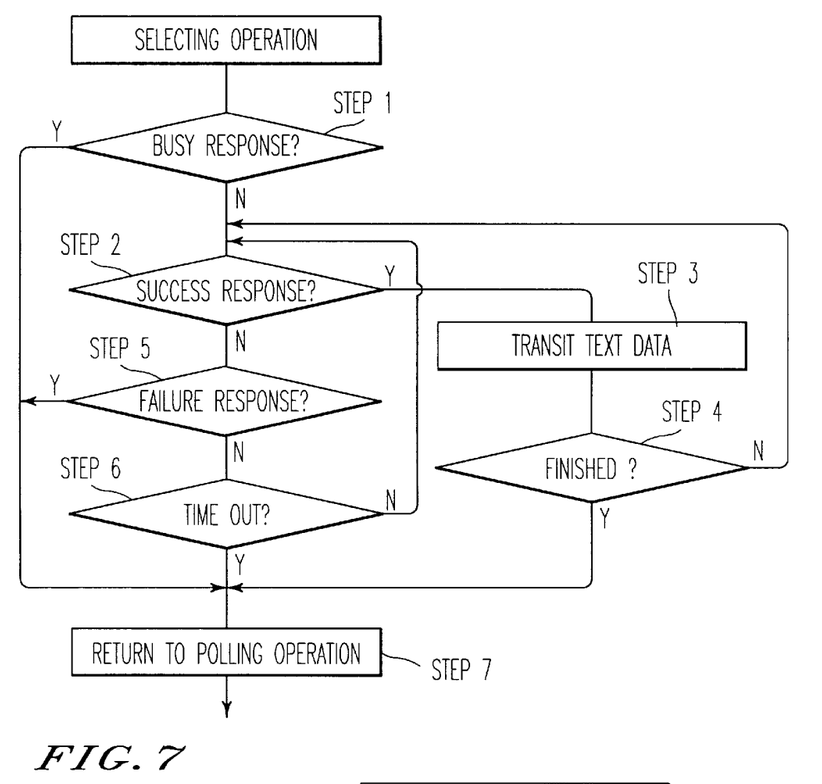
FIG. 7 is a flowchart showing a selecting operation according to the present invention.

FIG. 7 shows the selecting operation. Each copier 1 to 5 has a unique device code respectively. The data communication device 7 transmits a selection identified code indicating a selecting operation and a device code for selecting a copier of the copiers 1 to 5 through, e.g., a RS-485 serial interface. Each copier 1 to 5 compares its stored unique device code with the device code transmitted from the data communication device 7. The copier with the unique device code in agreement with the transmitted device code from the data communication device 7 executes the following operation as shown in FIG. 7.

Referring to FIG. 7, if the selected copier has stored data for transmitting to the data communication device 7, the selected copier transmits a busy response to the data communication device 7 (in step 1). In response to the busy response, the data communication device 7 stops the selecting operation and initiates a polling operation (in step 7). If the selected copier has not stored data for transmitting to the data communication device 7 (NO in step 1), the selected copier judges whether it can communicate with the data communication device 7 (in step 2). If the selected copier can communicate with the data communication device 7 (YES in step 2), the selected copier transmits a success-response to the data communication device 7 and then communication of text data between the data communication device 7 and the selected copier is established (in step 3), and is executed until completed (in step 4). If the selected copier can not communicate with the data communication device 7 (NO in step 2), the selected copier transmits a failure-response to the data communication device 7 (in step 5) and the communication between the selected copier and the data communication device 7 is finished. If the data communication device 7 does not receive any response from the selected copier, the data communication device 7 terminates the selecting operation after a predetermined period of time has elapsed (in step 6).

2) Communication Control From The copiers 1 to 5 To the Service Terminal 6 or The Data Communication Device 7 a) When a copier breaks down and an image forming operation can not be performed, information indicating that a copier is broken down is transmitted to the service terminal 6 through the data communication device 7 and the data communication line 8 immediately. This data communication is referred to as a SC CALL.

b) When predetermined keys, e.g., the ten-key pad 71, the clear/stop key 72, and the mode clear/preheating key 76 of FIG. 5, etc., are pressed in a predetermined manner by an operator, the screen 83 of a copier changes its indication from an indication for inputting an operation command for image formation (an image forming mode) to an indication for inputting a request command for transmitting request data from the copier to the service terminal 6 through the data communication device 7 (a request mode). In the request mode, when an operator touches, e.g., the CALL key on the screen 83, request data is transmitted from the copier to the service terminal 6 through the data transmission device 7 and the communication line 8. This data communication is referred to as a Request Call.

c) When predetermined keys, which are different from the predetermined keys of the Request Call, are pressed in a predetermined manner by a customer engineer, the screen 83 changes its indication from an indication for inputting an operation command for image formation (the image forming mode) to an indication for inputting a command by the customer engineer for transmitting data from the copier to the service terminal 6 through the data communication device 7. The customer engineer inputs the command when the customer engineer starts a repair and finishes the repairs. Therefore, the repair starting time and the repair finishing time are understood by an operator at the service terminal 6. This data communication is referred to as a CE (Customer Engineer) call.

d) The copier 1 to 5 transmits an alarm message for preventive maintenance to the service terminal 6 through the data communication device 7 and the communication line 8 at a specified time if, e.g., a predetermined number of copies are made, a predetermined period of time has elapsed, an output from sensors which sense conditions of processing devices in the copier reach a predetermined value, etc. This data communication is referred to as an Alarm Call.

The data communication device 7 polls the selected copier 1 to 5, and if the polled copier has data to be transmitted to the service terminal 6, the copier transmits the data to the service terminal 6 through the data communication device 7 and the data communication line 8 according to a) to d). The polling operation polls the copiers 1 to 5 in turn and checks whether any of the copier has a transmission request.

Figure 8:
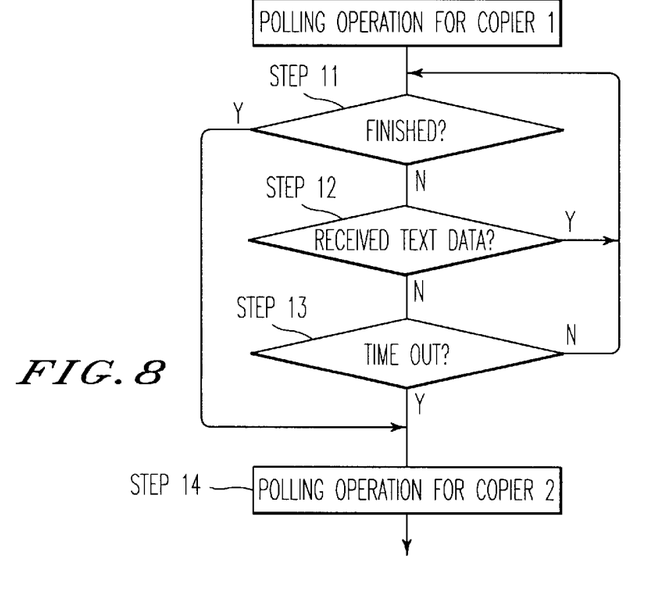
FIG. 8 is a flowchart showing a polling operation according to the present invention.

FIG. 8 shows the polling operation. The data communication device 7 transmits a polling identified code indicating the polling operation and the device code for selecting a copier through, e.g., a RS-485 serial interface. Each copier 1 to 5 compares its unique device code with the device code transmitted from the data communication device 7. The copier with the unique code in agreement with the transmitted device code from the data communication device 7 executes the following operation as shown in FIG. 8.

If the polled copier has stored data for transmission to the data communication device 7, the polled copier transmits text data to the data communication device 7 (in steps 11 and 12). If the polled copier does not have any data for transmission to the data communication device 7 or the data transmission of the text data has been finished (YES in step 11), the communication between the polled copier and the data communication device 7 is terminated by transmitting a specific code indicating data transmission termination to the data communication device 7. When the data communication device 7 receives this termination specific code, the data communication device 7 polls the next copier (in step 14).

If the copier with the device code in agreement with the transmitted device code can not communicate with the data communication device 7, e.g., if electric power is not supplied to the copier or the like, the data communication device 7 finishes its polling operation after a predetermined period of time has elapsed (in step 13). The data communication device 7 then continues to poll the copiers 1 to 5 until the selecting operation starts.

3) Control The Data Communication Device 7 Itself

An operation of controlling the data communication device 7 itself includes an operation for reading out total counter values of each copier 1 to 5 from memories in the data communication device 7. The total counter value of each copier 1 to 5 is transmitted to the data communication device 7 in response to a selecting operation operated by the data communication device 7, e.g., once a day at a predetermined time. If electric power is not supplied to the copier at the predetermined time, the total counter value is transmitted when a power switch of the copier is turned on.

The data transmission device 7 can include two memories, a memory A and a memory B. Total counter values that are transmitted from the copiers in response to the selecting operation can be stored in memory A. The total counter values stored in memory A are accumulated every day. The accumulated total counter values in the memory A can then be transferred to memory B periodically, e.g. once a month. The transferring day and time can be transmitted from the service terminal 6 to the data communication device 7 and then the transmitted day and time can be stored in a non-volatile RAM in the data transmission device 7. The accumulated total counter values can then be transmitted from the memory B to the service terminal 6 through the data communication line 8.

Figure 9:
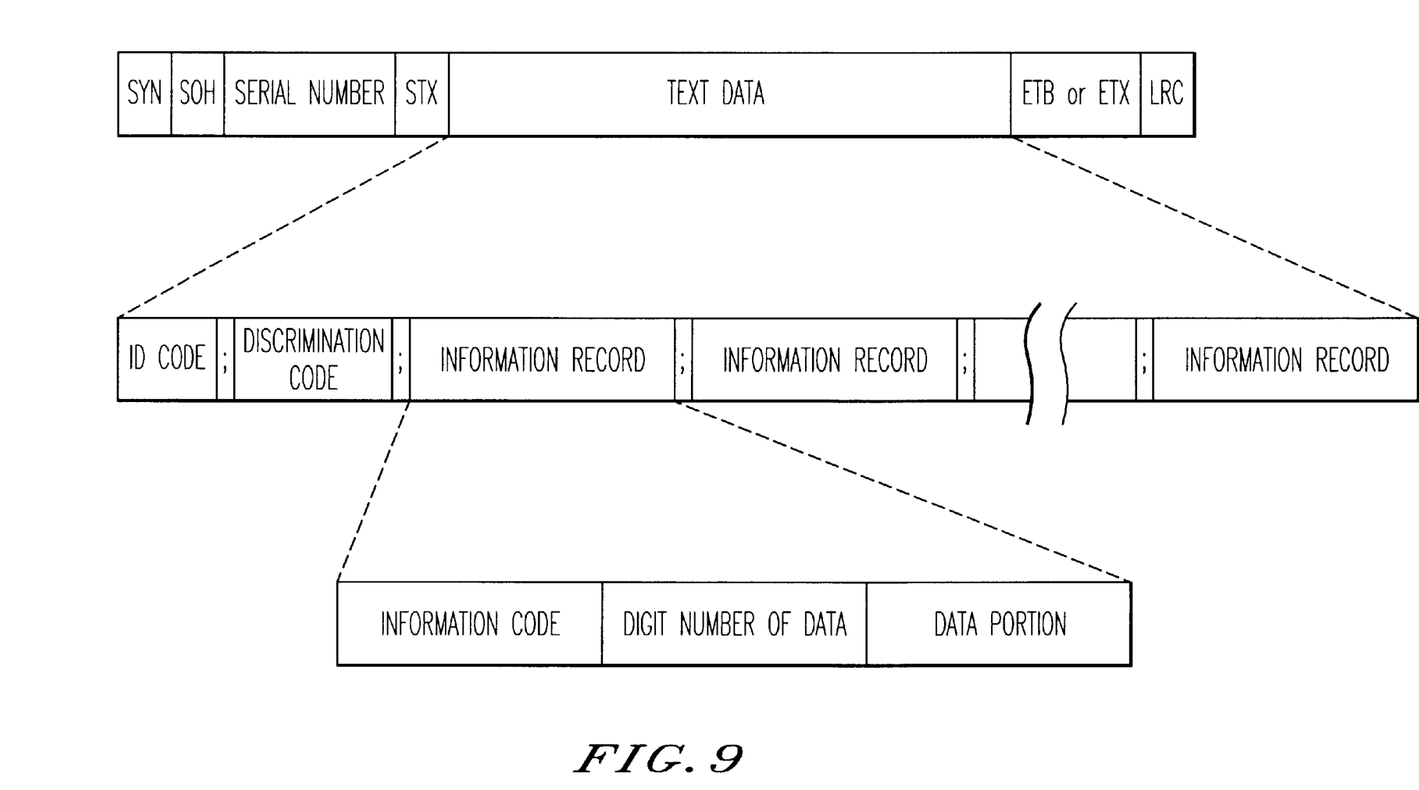
FIG. 9 shows a data format communicated between a service terminal and a data communication device in the present invention.

FIG. 9 shows one form that the text data communicated between the service terminal 6 and the data communication device 7 can take. The test data can take the form of ASCII, although clearly other representations, such as binary, can be used. A first block can be designated as 01 and the number can increase one by one. If the number reaches 99, the number is set as 00. Referring to FIG. 9, the following codes and data are shown. An ID is a code which includes a model number and a manufacturing number of each copier to specify a copier among the copiers 1 to 5. A discrimination code is a code which includes a processing code indicating a type of the processing, a source of data transmission and a source of data receipt. The processing code can be determined by the following Table 1.

TABLE 1

| Code | Names of Processing | Contents of Processing |
| --- | --- | --- |
| 30 | SC CALL | When a copier breaks down, data is transmitted from the copier to the service terminal 6. |
| 31 | Manual CALL | Request data is transmitted from the copier to the service terminal 6 in response to operation of keys on the operation panel 83 of the copier. |
| 32 | Alarm CALL | If the copier is in an alarm condition, the copier transmits data to the service terminal 6. |
| 02 | Data Reading | Data in memories in the copier is read in response to a command from the service terminal 6 or the data communication device 7. |
| 04 | Data Writing | Data which is transmitted from the service terminal 6 is written in the memories in the copier. |

Information records can include information code, digit number of data and data portion as shown in Table 2.

TABLE 2

| Code | Contents of Code |
| --- | --- |
| Information Code | Code which indicates the kind of data. |
| Digit Number of Data | Length of data portion. If there is no data, the digit number is 00. |
| Data Portion | Data which is indicated by the information code. |

Semicolons (;) for separating data can be inserted between the ID code and the discrimination code, the discrimination code and the information record, and the information record and the next information record, respectively.

Figure 10:
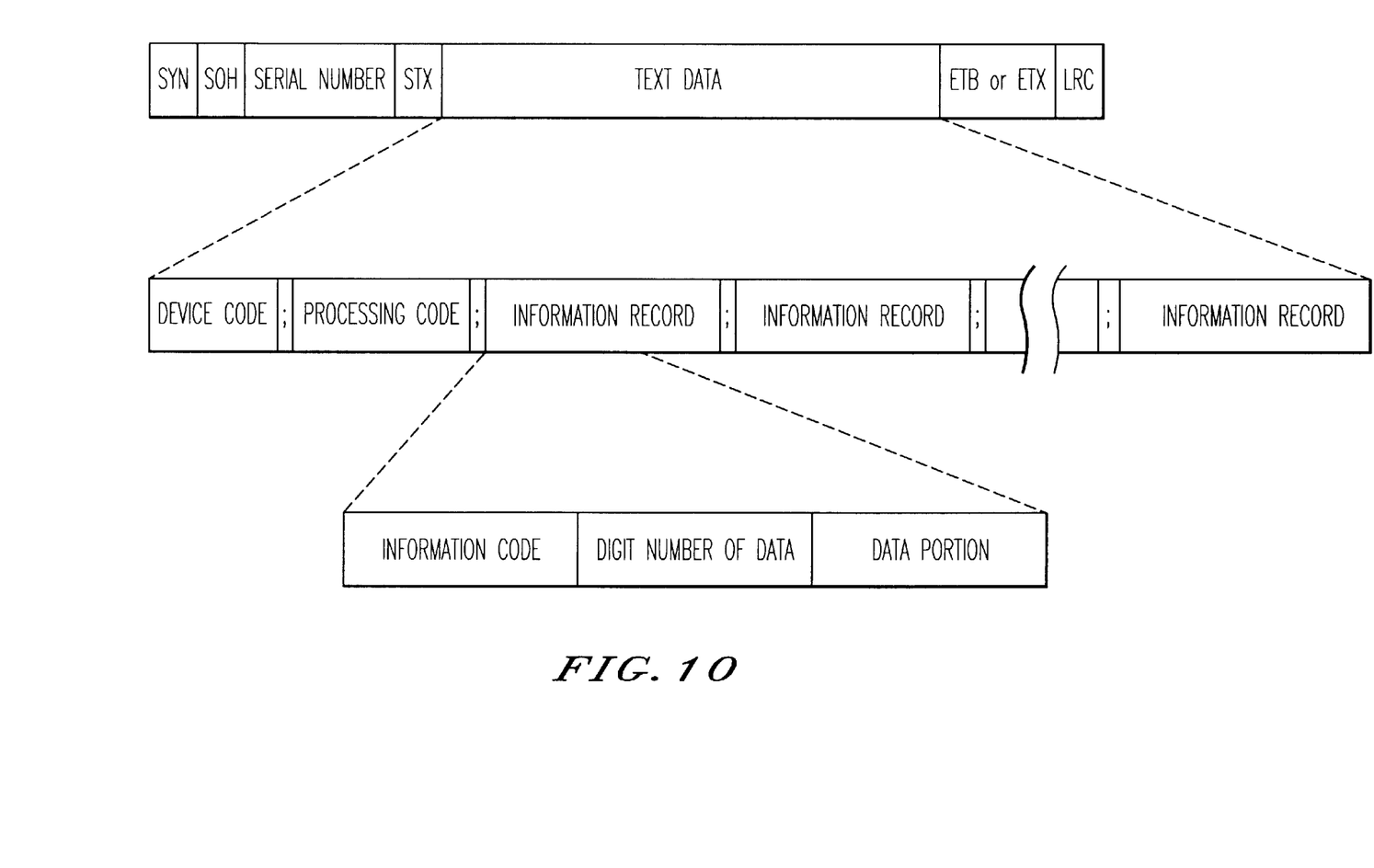
FIG. 10 shows a data format communicated between a data communication device and an interface in an image forming apparatus in the present invention.

FIG. 10 shows one form that the text data communicated between the data communication device 7 and the interface 17 in each copier 1 to 5 can take. Referring to FIG. 10, the device code is a code which includes numbers 1 to 5 assigned to each copier. The device code is set by the device code setting switch 30 of FIG. 3. The set device code is connected to the ID code by the data communication device 7. The processing code is a code which indicates a name of the processing and can be identical with the processing code of FIG. 9.

Figure 11:
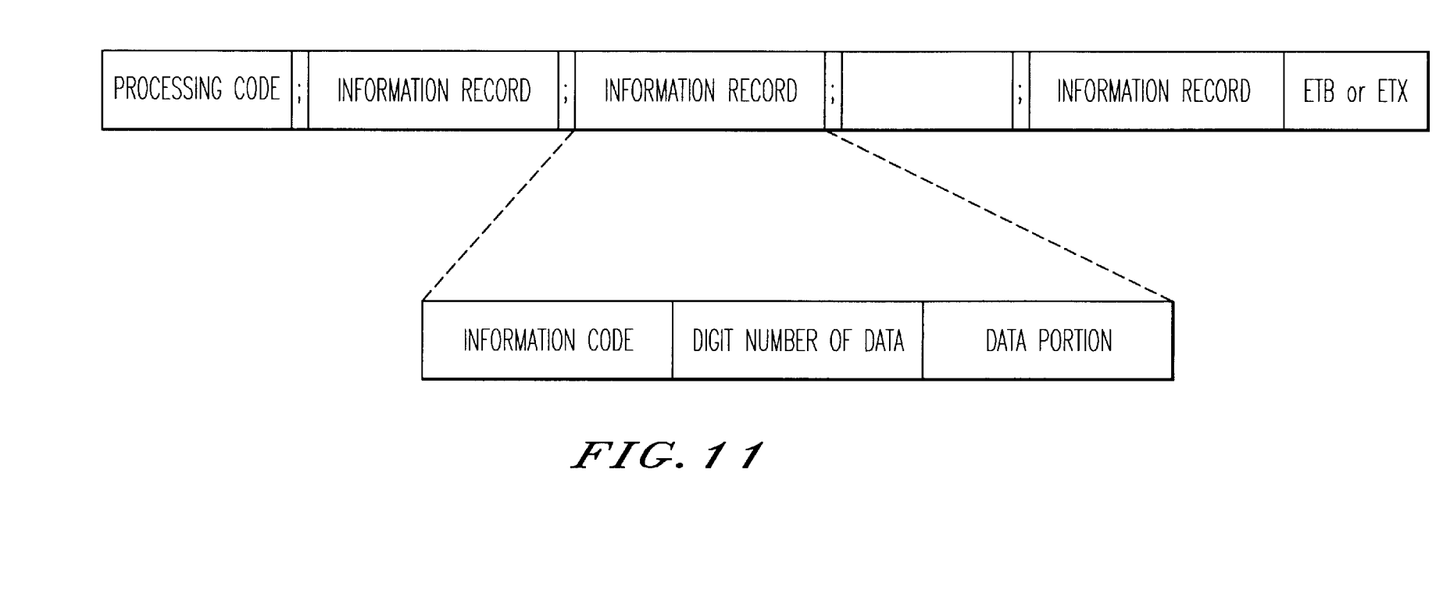
FIG. 11 shows a data format communicated between an interface and a controller of an image forming apparatus in the present invention.

FIG. 11 shows one form that the text data communicated between the interface 17 and the copier controller 31 of FIG. 3 can take. The text data of FIG. 11 includes the processing code and the information record.

As noted above, one drawback in background systems is that if a copier is sending a request command to a service terminal, the copier will not be able to operate in an image forming mode until a response to the request command is returned to the copier from the service terminal. In such instances, in such background devices a display of the copier will indicate operation in their request mode, and the copier will not be operable in an image forming mode until the request mode has ended.

One feature of the present invention is to allow operation of an image forming apparatus in an image forming mode while still awaiting completion of a request mode. In this operation of the present invention, a display of the image forming apparatus can change from a display for an image forming mode to a display for a request mode and back to the display for the image forming mode before the request mode is completed, as discussed in further detail below with reference to FIG. 12 and FIGS. 13–16; FIGS. 13–16 show various display conditions of screen 83 of a copier 1 to 5.

Figure 12:
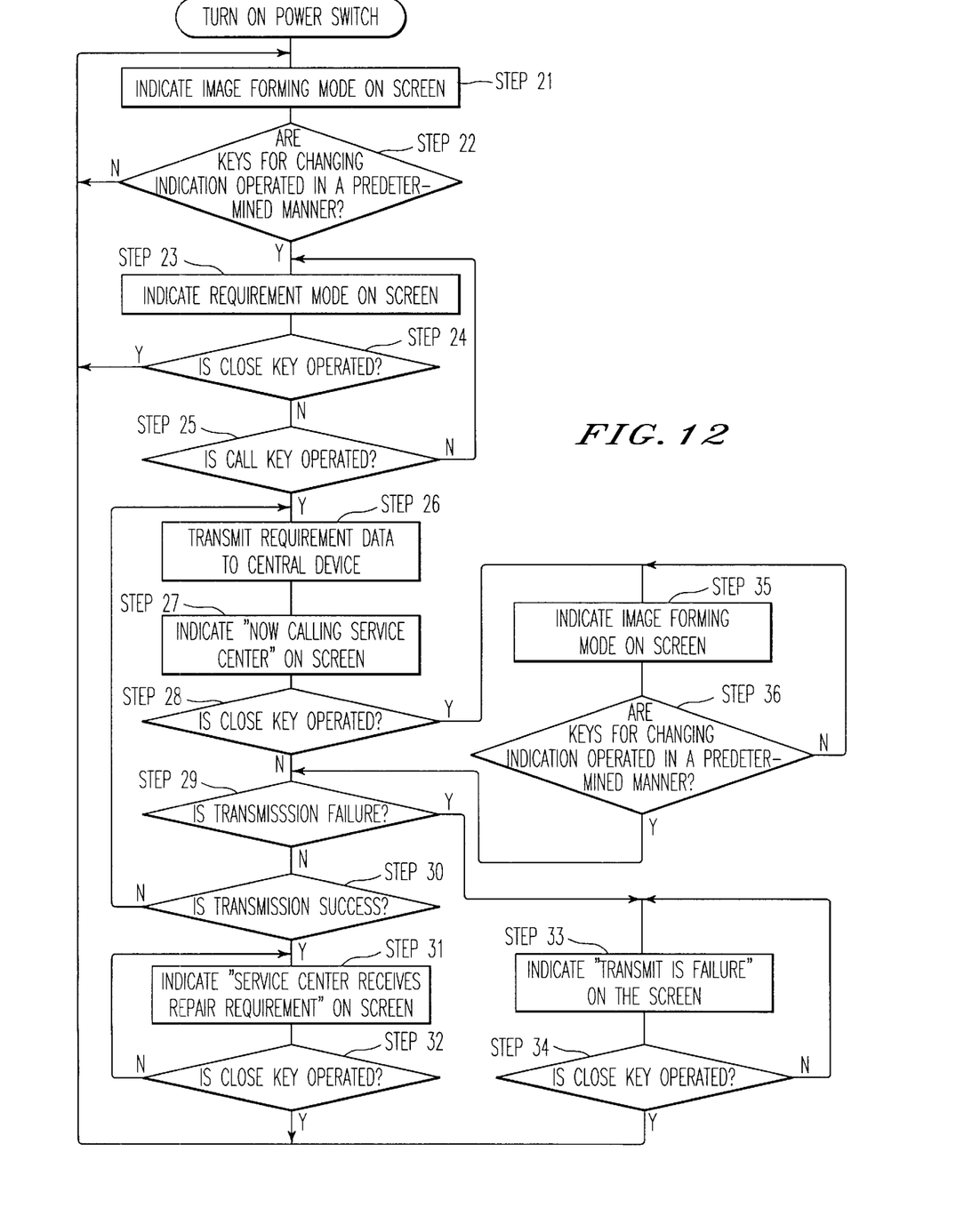
FIG. 12 is a flowchart showing a process for indicating a message on a screen of FIG. 5 according to the present invention.

FIG. 12 shows a process for indicating a message on the screen 83 as shown in FIG. 4 of a copier 1 to 5. This process can be controlled by the copier controller 31 which includes the CPU 11, the ROM 12, the RAM 13, the non-volatile RAM 14, the I/O port 15, and the serial communication unit 16. Referring to FIG. 12, after a power source switch of a copier 1 to 5 is turned on, the screen 83 indicates a message for inputting an operation command for image formation as shown in FIG. 6 (in step 21). The copier controller 31 judges whether predetermined keys for changing an indication of the screen 31 are pressed or not (in step 22). If the predetermined keys on the operation panel are pressed in a predetermined manner (for example if at first the mode clear/preheating key 76 is pressed, then the 0 key of the ten-key is pressed two times in succession, and finally the clear/stop key 72 is pressed), the screen 83 changes its indication from an indication for inputting an operation command for image formation (an image forming mode display) to an indication for inputting a request command for transmitting a request from the copier to the service terminal 6 (a request mode display) as shown in FIG. 13 (in step 23).

Figure 13:
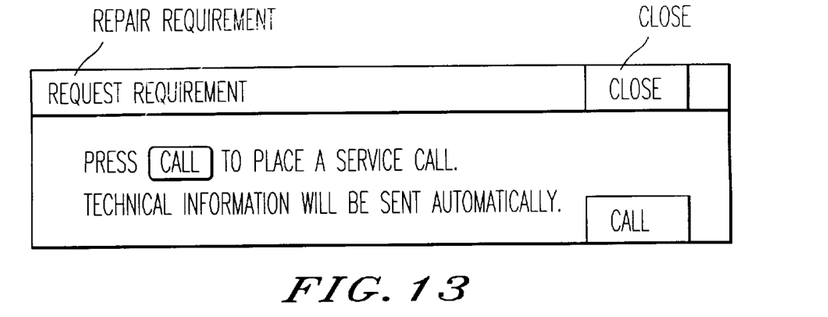
FIG. 13 shows a screen in which a message is displayed indicating that a transmission request can be input as an operation of the present invention.

The copier controller 31 then judges whether a predetermined key, e.g. the CLOSE key of FIG. 13, is pressed or not (in step 24). If the CLOSE key is pressed (YES in step 24), the screen 83 changes its indication to an indication for inputting an operation command for image formation (by returning to step 21). If the CLOSE key is not pressed (NO in step 24), the copier controller 31 judges whether a further predetermined key, e.g. the CALL key of FIG. 13, is pressed or not (in step 25). If the CALL key is not pressed (NO in step 25), the screen 83 does not change its indication (by returning to step 23).

Figure 14:
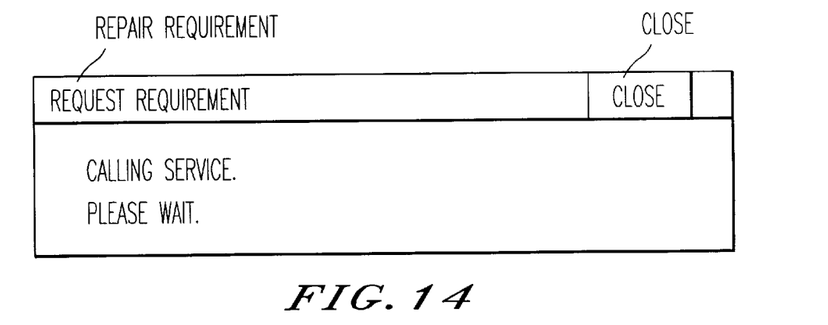
FIG. 14 shows a screen in which a message is displayed indicating a transmission is occurring as an operation of the present invention.

If the CALL key of FIG. 13 is pressed in step 25 (YES in step 25), a request is transmitted from the copier to the service terminal 6 through the data communication device 7 and the data communication line 8 when the copier is polled by the data communication device 7 as shown in FIG. 8 (in step 26). Then, the screen 83 indicates a message as shown in FIG. 14 (in step 27). The data which is transmitted to the service terminal 6 includes text data as shown in FIG. 9. When the service terminal 6 receives the transmitted data, the service terminal 6 transmits a success-response to the data communication device 7. The data communication device 7 transmits the success-response to the copier which is selected by the selecting operation of FIG. 7.

Figure 15:
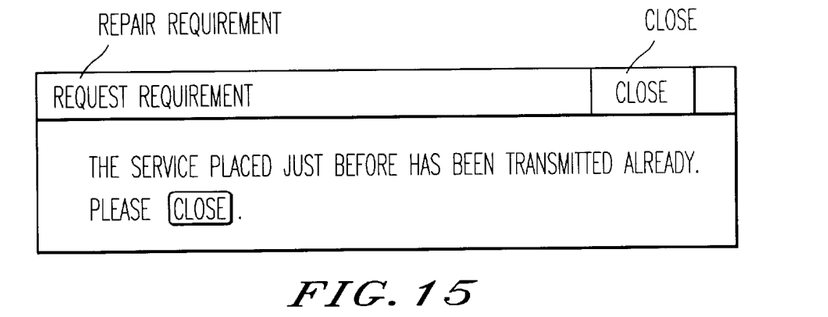
FIG. 15 shows a screen in which a message is displayed indicating that a transmission has been completed as an operation of the present invention.

In FIG. 12, the copier controller 31 then judges whether the, e.g., CLOSE key of FIG. 14 is pressed or not (in step 28). If the CLOSE key is not pressed (NO in step 28), the copier controller 31 checks the transmission conditions (in steps 29 and 30). If the copier controller 31 receives a success-response in step 30, the copier controller 31 indicates a message as shown in FIG. 15 (in step 31). Then, the copier controller 31 judges whether the, e.g., CLOSE key of FIG. 15 is pressed or not (in step 32). If the CLOSE key is pressed (YES in step 28), the screen 83 changes its indication to the indication for inputting the operation command for the image formation (in step 35).

Figure 16:
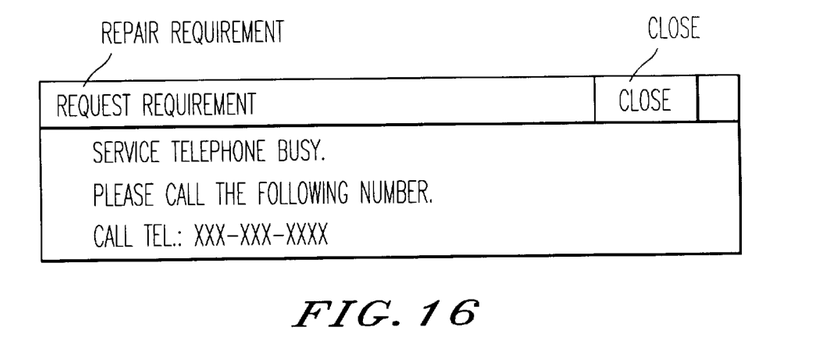
FIG. 16 shows a screen where a message is displayed indicating that a transmission has failed because a communication line is busy as an operation of the present invention.

If the copier controller 31 judges that the transmission is a failure (in step 29), the screen 83 indicates a message as shown in FIG. 16 (in step 33). The copier controller 31 then judges whether the, e.g., CLOSE key of FIG. 16 is pressed or not (in step 34). If the CLOSE key is pressed (YES in step 34), the screen 83 changes its indication to an indication for inputting the operation command for the image formation (by returning to step 21).

In the present embodiment, if the copier controller 31 receives the failure-response from the service terminal 6 through the data communication device 7, the copier controller 31 judges whether the transmission is a failure. Further, if the requirement can not be transmitted to the service terminal 6, even if the data communication device 7 calls in a predetermined number of times at a predetermined intervals to the service terminal 6, the copier controller judges that the transmission is a failure. In this case, the data communication device 7 transmits the failure-response to the copier which transmitted the request data.

If the CLOSE key of FIG. 14 is pressed after the CALL key of FIG. 13 is pressed and before the screen 83 indicates the message of FIG. 15 or 16, the screen 83 changes its indication to an indication for inputting the operating command for the image formation as shown in FIG. 5 (in step 35). If, e.g., the keys for setting the image forming mode and the start key 73 are pressed, the copier controller 31 controls the copier such that the copier starts the image forming operation. Even if the screen 83 changes its indication and the copier starts the image forming operation, the data transmission of the request data from the copier to the service terminal 6 through the data communication device 7 and the communication line 8 has been continued.

The copier controller 31 judges whether the keys are pressed in the predetermined manner as explained at steps 22 and 23 or not (in step 36). If the keys are pressed (YES in step 36), the screen 83 changes its indication to the indication of FIG. 14, 15 or 16 corresponding to the condition of data transmission. Namely, if the copier controller 31 does not receive the response from the data communication device 7, the message of FIG. 14 is indicated on the screen 83 (in step 26). If the copier controller 31 receives the success-response, the message of FIG. 15 is indicated on the screen 83 (in step 31). If the copier controller 31 receives the failure-response, the message of FIG. 16 is indicated on the screen 83 (in step 33).

According to the present embodiment, if the operator operates keys on the operation panel of each copier 1 to 5 in the predetermined manner, the screen 83 changes its indication from the image forming mode to the request mode. If the operator presses the CALL key, the requirement is transmitted to the service terminal 6 through the data communication device 7 and the communication line 8, and the screen 83 indicates a message "Now Calling Service Center. Please wait a minute" and the CLOSE key. If the operator presses the CLOSE key, the screen 83 changes its indication from the request mode to the image forming mode. In the image forming mode, if the keys for setting the image forming mode and the start key 73 are pressed, the copier controller 31 controls the copier such that the copier starts the image forming operation. Even if the screen 83 changes its indication and the copier starts the image forming operation, the data transmission of the request data from the copier to the service terminal 6 through the data communication device 7 and the communication line 8 is continued.

When the copier controller 31 receives the success response or the failure-response from the data communication device 7, messages for indicating the result of the data transmission are indicated on the screen 83. If the operator presses the CLOSE key on the screen 83, the screen 83 changes its indication from the request mode to the image forming mode.

If the copier controller 31 receives the response of the result of the data communication when the copier is in the image forming mode, the messages for indicating the result of the data transmission are indicated on the screen 83 when the screen 83 changes its indication from the image forming mode to the request mode by operating the keys of the operation panel in the predetermined manner. Therefore, the operator can see the result of the data transmission.

In the present embodiment, the indication of the screen 83 can thus be changed from the request mode to the image forming mode even if the request data transmission has not yet been changed. It is also possible that when the data transmission is made under the CE call mode or alarm call mode, the indication of the screen 83 can be changed from the CE call mode or the alarm call mode to the image forming mode even if the request mode data transmission has not yet been changed. Under the requirement mode and the CE call mode, the indication of the screen 83 can be changed from the image forming mode to the request mode or the CE call mode by operating the keys in a predetermined manner. On the other hand, under the alarm call mode, the indication of the screen 83 is automatically changed from the image forming mode to the alarm call mode under control of the copier controller 31, when the selected copier 1 to 5 is in a data transmission condition. In the indication of the CE call mode and the alarm call mode, a message for indication of the data transmission condition and also the CLOSE key for changing the indication of the screen 83 from the alarm call mode to the image forming mode are indicated on the screen 83. If the operator or the customer engineer presses the CLOSE key, the indication of the screen 83 is changed from the CE call mode or the alarm call mode to the image forming mode for forming an image. The operator and the customer engineer can see the transmission conditions by operating the keys in a predetermined manner.

In the present embodiment, when the plural keys are pressed in the predetermined manner, the screen 83 changes its indication from the image forming mode to the request mode. Therefore, it is not necessary to provide an exclusive key. However, it is also possible to provide an exclusive key for changing the indication from the request mode to the image forming mode.

Further, it is also possible to connect other apparatuses such as a printer or a facsimile machine instead of or together with the copiers 1 to 5 to this administration system.

Obviously, numerous additional modifications and variations of the present invention are possible in light of the above teachings. It is therefore to be understood that within the scope of the appended claims, the present invention may be practiced otherwise than as specifically described herein.

The present application is based in Japanese Priority Document 9-52935, the contents of which are incorporated herein by reference.

What is claimed as new and desired to be secured by Letters Patent of the United States is:

1. A method of operating an image forming apparatus, comprising the steps of:
   generating an image while a display of the image forming apparatus is in an image forming mode;
   changing the display to a communication mode;
   communicating information between the image forming apparatus and a service terminal connected to the image forming apparatus, the information including the image forming apparatus initiating a call to the service terminal;
   changing the display from the communication mode to the image forming mode before the step of communicating is completed.

2. The method according to claim 1, wherein the service terminal is a central station remotely located from the image forming apparatus.

3. The method according to claim 1, wherein the service terminal is within a local region shared with the image forming apparatus.

4. The method according to claim 1, wherein the image forming apparatus and the service terminal are connected by a LAN.

5. The method according to claim 1, further comprising the step of:
   controlling communications between the image forming apparatus and the service terminal by a communications CPU separate from a main CPU of the image forming apparatus in order to free the main CPU for image forming operations.

6. The method according to claim 1, wherein the communications CPU is external to the image forming apparatus.

7. The method according to claim 1, wherein the communications CPU is internal to the image forming apparatus.

8. The method according to claim 5, wherein the step of controlling communications continues to control said step of communicating information after the step of changing the display from the communication mode to the image forming mode.

9. The method according to claim 8, further comprising the step of:

changing the display to the communication mode after the step of changing to the image forming mode, and displaying a status of said step of communicating information.

10. An administration system for an image forming apparatus, comprising:

a display on the image forming apparatus displaying that the image forming apparatus is in an image forming mode and a communication mode;

a communicating network communicating information between the image forming apparatus and a service terminal connected to the image forming apparatus, the information including the image forming apparatus initiating a call to the service terminal;

a controller changing the display of the image forming apparatus from the communication mode to the image forming apparatus and service terminal is completed.

11. The system according to claim 10, wherein the service terminal is a central station remotely located from the image forming apparatus.

12. The system according to claim 10, wherein the service terminal is within a local region shared with the image forming apparatus.

13. The system according to claim 10, wherein the image forming apparatus and the service terminal are connected by a LAN.

14. The system according to claim 10, further comprising:

a communications CPU controlling communications between the image forming apparatus and the service terminal separate from a main CPU of the image forming apparatus in order to free the main CPU for image forming operations.

15. The system according to claim 10, wherein the communications CPU is external to the image forming apparatus.

16. The system according to claim 10, wherein the communications CPU is internal to the image forming apparatus.

17. The system according to claim 14, wherein the information is communicated after changing the display from the communication mode to the image forming mode.

18. The system according to claim 17, wherein the display changes to the communication mode after changing to the image forming mode, and further displays a status of said communicating information.

19. An administration system for an image forming apparatus, comprising:

display means for displaying that the image forming apparatus is in an image forming mode and a communication mode;

a communicating means for communicating information between the image forming apparatus and a service terminal connected to the image forming apparatus, the information including the image forming apparatus initiating a call to the service terminal;

control means for changing the display means from the communication mode to the image forming mode before communication of the information between the image forming apparatus and service terminal is completed.

20. The system according to claim 19, wherein the service terminal is a central station remotely located from the image forming apparatus.

21. The system according to claim 19, wherein the service terminal is within a local region shared with the image forming apparatus.

22. The system according to claim 19, wherein the image forming apparatus and the service terminal are connected by a LAN.

23. The system according to claim 19, further comprising:

a communications control means for controlling communications between the image forming apparatus and the service terminal separate from a main CPU of the image forming apparatus in order to free the main CPU for image forming operations.

24. The system according to claim 19, wherein the communications CPU is external to the image forming apparatus.

25. The system according to claim 19, wherein the communications CPU is internal to the image forming apparatus.

26. The system according to claim 23, wherein the information is communicated after changing the display means from the communication mode to the image forming mode.

27. The system according to claim 26, wherein the display means changes to the communication mode after changing to the image forming mode, and further displays a status of said communicating information.

* * * * *